United States Patent
Parekh (10) Patent No.: US 10,778,798 B2
(45) Date of Patent: Sep. 15, 2020

(54) REMOTE SERVICE ACCESS IN A CONTAINER MANAGEMENT SYSTEM

(71) Applicant: Hewlett Packard Enterprise Development LP, Houston, TX (US)

(72) Inventor: Hardik Dhirendra Parekh, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 56 days.

(21) Appl. No.: 16/169,217

(22) Filed: Oct. 24, 2018

(65) Prior Publication Data

US 2020/0137185 A1    Apr. 30, 2020

(51) Int. Cl.
  *H04L 29/08* (2006.01)
  *H04L 29/12* (2006.01)
  *G06F 9/50* (2006.01)

(52) U.S. Cl.
  CPC ........ *H04L 67/2814* (2013.01); *G06F 9/5072* (2013.01); *H04L 61/1511* (2013.01); *H04L 61/6013* (2013.01); *H04L 67/16* (2013.01); *H04L 67/327* (2013.01); *H04L 67/10* (2013.01)

(58) Field of Classification Search
  CPC ............. H04L 67/2814; H04L 61/1511; H04L 61/6013; H04L 67/327; H04L 67/16; G06F 9/5072
  See application file for complete search history.

(56) References Cited

U.S. PATENT DOCUMENTS

| | | | | |
|---|---|---|---|---|
| 10,291,462 | B1* | 5/2019 | Joyce | H04L 41/042 |
| 2003/0110242 | A1* | 6/2003 | Brown | H04L 67/02 |
| | | | | 709/222 |
| 2015/0281111 | A1* | 10/2015 | Carl | H04L 47/70 |
| | | | | 709/226 |
| 2017/0193525 | A1* | 7/2017 | Shah | H04L 63/02 |
| 2019/0052532 | A1* | 2/2019 | Chen | H04L 41/0893 |

(Continued)

FOREIGN PATENT DOCUMENTS

| | | |
|---|---|---|
| CN | 107302604 | 10/2017 |
| CN | 107667517 | 2/2018 |

OTHER PUBLICATIONS

Abdullah Kajamohideen, "Automatic Proxy Configuration using PAC File, Batch Script and Windows Server 2012 GPP", available online at <https://vmokshagroup.com/tag/automatic-proxy-configuration/>, Vmoksha, 2013, 7 pages.

(Continued)

*Primary Examiner* — Mohamed A. Wasel
(74) *Attorney, Agent, or Firm* — Jaffery Watson Mendonsa & Hamilton (57) ABSTRACT

A container management system having a first cluster that includes a first service for generating an operation and a second cluster that includes a second service for generating an operation, the second cluster located remotely from the first cluster. A master proxy adjusts a request from the first cluster to access the second service from the second cluster, routes a transmission of the adjusted request to the second cluster and adjusts a response to the adjusted request from the second cluster to the first cluster. The first cluster uses the response to generate a cluster operation based on the first service and the second service.

20 Claims, 6 Drawing Sheets

(56) References Cited

U.S. PATENT DOCUMENTS

2019/0173840 A1\* 6/2019 Desai .................... H04L 63/029
2019/0306022 A1\* 10/2019 Shimoga Manjunatha .................
H04L 47/122

OTHER PUBLICATIONS

VMware—Service User's Guide, "Configure HTTP Proxy Settings", Software Manager 1.3, 2015, 5 pages.
Bakker, P.; "One Year Using Kubernetes in Production: Lessons Learned"; 21 pages; retrived on May 4, 2018 from: https://techbeacon.com/one-year-using-kubernetes-production-lessons-learned.
Kajamohideen, A.; "Setting Up Traefik as a Dynamically-configured Proxy and Load-balancer"; Jul. 12, 2017; 8 pages.
Openshift.com; "Working with Http Proxies"; 9 pages; retrieved on May 4, 2018 from: https://docs.openshift.com/container-platform/3.4/install_config/http_proxies.html.
Rancher.com; "Setting Up Traefik as a Dynamically-configured Proxy and Load-balancer"; Jul. 12, 2017; 16 pages.
Wilder, J.; "Automated Nginx Reverse Proxy for Docker"; Mar. 25, 2014; 18 pages.

\* cited by examiner

FIGURE 6 under_which the page # US 10,778,798 B2

REMOTE SERVICE ACCESS IN A CONTAINER MANAGEMENT SYSTEM

BACKGROUND

For enterprise data storage, clustering can refer to the physical connection of independent compute nodes (servers) and a controlling function. The controlling function can distribute workloads to each node, manage the transfer of workloads between nodes, or both. Such clustering can include a shared storage system, along with a mechanism to duplicate the data in the storage system that is directly attached to each node that may be used. Common storage clustering applications provide failover capabilities for critical processes and enable load balancing for high-performance processes. Operation containerization can be an operating system (OS)-level virtualization method used to deploy and run distributed operations without launching an entire virtual machine (VM) for each operation. Multiple isolated operations run on a single host and access the same OS kernel. For example, Container Linux (formerly CoreOS Linux) may be one of the first container operating systems built for containers. Software containers are a form of OS virtualization where the running container includes minimum operating system resources, memory, and services to run an operation.

DETAILED DESCRIPTION

A data center operating system, such as a Kubernetes container management system for example, can include a free and open source container management system that provides mechanisms for deploying, maintaining and scaling containerized management systems, such as a Kubernetes container management system for example. Such systems are intended to provide a platform for automating deployment, scaling, and operations of application containers across clusters of hosts and utilizes a command-line interface (CLI) that allows for running commands against clusters within the container management system. Commands can be defined that can be used to construct the CLI to manage a cluster, and to gather information from the commands so that cluster resources or services may be created, grouped, updated, and/or deleted. In this way, a container management system defines a set of building blocks or primitives that collectively provide mechanisms such as the CLI that deploy, maintain, and scale operations. The container management system is extensible to meet different workloads. This extensibility is provided in large part by an application programming interface (API), which is used by internal components as well as extensions and containers that run on container management system.

The basic scheduling unit of a container management system is a pod, which adds a higher level of abstraction by grouping containerized components. A pod consists of one or more containers that are guaranteed to be co-located on the host machine and can share resources. Each pod in the container management system is assigned a unique IP address within a cluster, which allows the operations to use ports without the risk of conflict. A pod can define a volume, such as a local disk directory or a network disk, and expose it to the containers in the pod. Pods can be managed manually through the API, or their management can be delegated to a controller.

Further, a container management system may include a portable, extensible open-source platform for managing containerized workloads and services to provide a container-centric management environment and orchestrate computing, networking, and storage infrastructure on behalf of user workloads. A container management system may include assigning a unique IP to each container in a container management system that is addressable by any other container within a cluster of hosts. All operations and communications between components, and external user commands, are made using representational state transfer (REST) commands transmitted via an application programming interface (API). An API server receives the transmitted REST commands. Consequently, each object in the container management system platform is treated as an API object and has a corresponding entry in the API. API objects are used to describe a state of a cluster, including the operations or other workloads that are to run, what container images they use, the number of replicas, what network and disk resources to make available, and so forth. The state is set by creating objects using the API, typically via the command-line interface. The API may also be used directly to interact with the cluster and set or modify your desired state.

In some instances, a first cluster may receive a deployment configuration for creating a desired operation for which the first cluster may want to utilize a service within a second cluster that is remotely located from the first cluster. However, in order for the first cluster to communicate with a service located within the second cluster a public IP needs to be assigned to the desired service in order for the first cluster to receive the service from the second cluster, which can be costly. The assigned IP is then visible to the internet causing security concerns if the user associated with the first cluster or the second cluster desires that the service not be made publicly available. Therefore, the container management system according to the present disclosure enables the generation of a communication link between the first cluster and the remote second cluster without exposing the IP address of the clusters, thereby reducing security concerns and reducing the costs associated with providing an IP address. In addition, by using a domain name service (DNS) name, as described in detail below, the present disclosure provides added flexibility to the system.

The figures herein follow a numbering convention in which the first digit corresponds to the drawing figure number and the remaining digits identify an element or component in the drawing. For example, reference numeral 236 refers to element "236" in FIG. 2 and an analogous element may be identified by reference numeral 436 in FIG. 4. Analogous elements within a Figure may be referenced with a hyphen and extra numeral or letter. See, for example, elements 120-1, and 112-N in FIG. 1. Such analogous elements may be generally referenced without the hyphen and extra numeral or letter. For example, elements 121-1 and 121-N may be collectively referenced as 121. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

Figure 1:
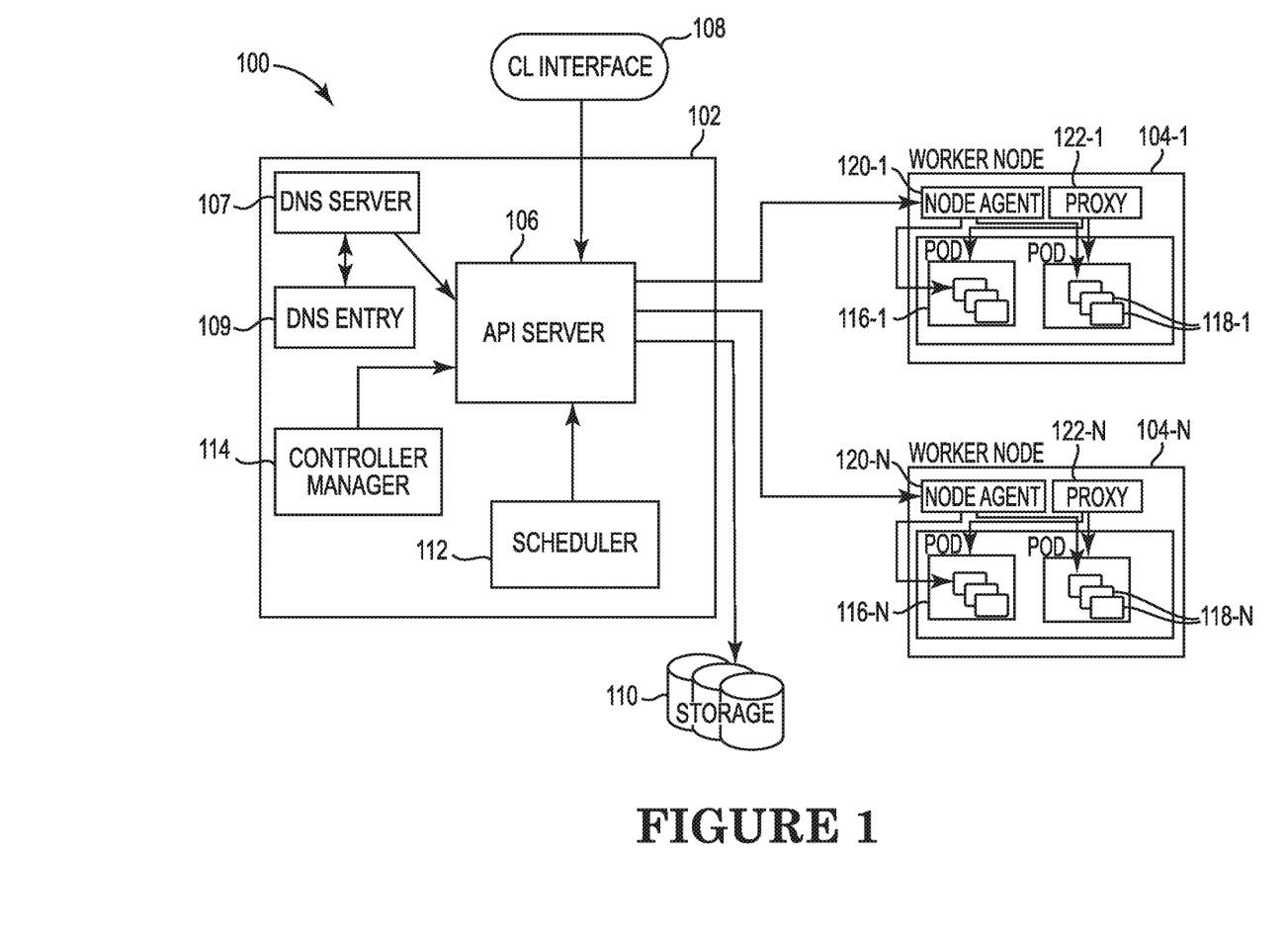
FIG. 1 is a schematic diagram of an example cluster of a container management system consistent with the present disclosure.

FIG. 1 is a schematic diagram of an example cluster 100 of a container management system consistent with the present disclosure. As illustrated in the example of FIG. 1, a container management system according to the present disclosure may include the cluster 100, such as a kubernetes cluster for example. The cluster 100 includes a master node 102, which is responsible for managing the cluster 100, and multiple worker nodes 104-1, . . . , 104-N (hereinafter referred to collectively as worker nodes 104) within which the services of the cluster 100 are operating to perform a requested operation. Examples of such requested operations can include operations such as create deployment, delete deployment, update deployment, and so forth. While two worker nodes 104 are illustrated in FIG. 1 for brevity sake, it is understood that the cluster 100 may include more than two worker nodes 104 (e.g., such as N number of worker nodes 104).

The master node 102 can be the entry point of all administrative tasks for the cluster 100 and may be responsible for orchestrating one or more worker nodes 104, within which the services of the cluster 100 for generating an operation are located. The master node 102 includes an API server 106 that provides both the internal and external interface access to the container management system via the master node 102. The API server 106 receives commands, known as representational state transfer (REST) commands, from a command line (CL) interface 108 tool, such as a kubectl command line interface for example. The REST commands provide a set of architectural constraints that, when applied as a whole, emphasize scalability of component interactions, generality of interfaces, independent deployment of components, and intermediary components. The API server 106 processes the REST command requests, validates the commands, and executes the logic within the commands.

The results of the REST commands processed by the API server 106 are stored in a storage component 110, such as an etcd storage component for example, included within the master node 102. The etcd storage component reliably stores configuration data of the cluster, representing the state of the cluster (i.e., what nodes exist in the cluster, what pods should be running, which nodes should they be running on, etc.). The storage component 110 is a distributed, key value storage mainly used for shared configuration and service directory. The storage component 110 provides storage for REST commands received by the API server 106 to perform create-update-and-delete (CRUD) operations as well as an interface to register watchers on specific nodes, thereby providing a reliable way to notify the rest of the cluster 100 about configuration changes within the cluster 100. For example, the shared information in the storage component 110 enables the API server 106 to notify the entire cluster 100 about configuration changes such as jobs being scheduled, created and deployed, pod/service details and state, name spaces and replication information, and so forth.

The master node 102 also includes a scheduler 112 and a controller manager 114. The scheduler 112 can be included in the master node 102 to deploy pods and services onto the nodes 104. The scheduler 112 includes information regarding available resources on the cluster 102, as well as resources utilized for the services to run. As a result, the scheduler 112 makes decisions on where to deploy a specific service. The controller manager 112 uses the API server 106 to watch the shared state of the cluster 102. For example, the controller manager 112 can make corrective changes to the current state of the cluster 102 to change the current state to another state, re-create a failed pod or remove an extra-scheduled pod. In addition, the master node 112 can include a DNS server 107, such as a for example, which schedules the DNS pod and services on the cluster, and configures the kubelets to instruct individual containers to use the DNS service's IP to resolve DNS names 109.

A number of pods 116-1, . . . , 116-N (hereinafter referred to collectively as pods 116) are co-located in each of the worker nodes 104, and one or more containers 118-1, . . . , 118-N (hereinafter referred to collectively as containers 118) reside within each of the pods 116. The containers 118 are co-located on the host machine (machine where containers are running, i.e., worker node), and can share resources. The pods 116, which are the basic scheduling unit in Kubernetes, add a higher level of abstraction by grouping containerized components that share resources, such as storage, Linux namespaces, cgroups, IP addresses, and so forth. Each of the pods 116 is assigned a unique IP address within the cluster 100, which allows applications to use ports without the risk of conflict. Each of the pods 116 can define a volume, such as a local disk directory or a network disk, and expose the volume to the containers 118 within the pods 116. The pods 116 may be managed manually through the API server 106, or the management of the pods 116 may be delegated to a controller.

The containers 118 hold the running operation along with the libraries and components or services to run the software needed to run an operation. These components include files, environment variables, dependencies and libraries. The host operating system (operating system running on the node, i.e., container) constrains access of the containers 118 to physical resource, such as CPU, storage and memory, so that a single container, such as container 118-1, cannot take up all of a host's physical resources. A guest host operating system, on the other hand, includes instructions installed on either a virtual machine or partitioned disk that describes an operating system that is different than the host operating system. Therefore, a host operating system is installed on a computer and interacts with underlying hardware, while a guest operating system is located on a virtual machine.

The pods 116 included in a single worker node 104 are created, destroyed and re-created, based on the state of the server and the service itself, and therefore are not intended to continue to exist for a long period of time. Because of the relatively short lifespan of the pods 116, the IP address that they are served on may change, making the communication of the associated microservices difficult. Therefore, Kubernetes has introduced the concept of a service, which is an abstraction on top of a number of pods 116, typically using a proxy in order to be run on top of the services in order for other services to communicate via a virtual IP address. As a result, load balancing may be set up for numerous pods 116 so that the pods may be exposed via a service. The pods 116 can be recreated and have changes to it's corresponding IP protocol. Therefore, services are created having stable IP and DNS names which can be used by other pods to communicate with the pod. For example, consider an image-processing backend which is running with three replicas. Those replicas are fungible-frontends do not care which backend they use. While the actual pods that compose the backend set may change, the frontend clients should not need to be aware of those changes or to keep track of a list of the backends. Each of the services within the containers 118 of the cluster 100 is assigned a domain name service (DNS) name that includes a name identifying the pod 116 within which the service resides, along with a portion of the DNS name that identifies the name of the service.

Each of the worker nodes 104 includes a node agent, such as a kubelet for example, (e.g., worker node 104-1 includes node agent 120-1, hereinafter the node agents 120-1, . . . , 120-N are referred to collectively as node agents 120) and a proxy, such as a kube-proxy for example, (e.g., worker node 104-1 includes proxy 122-1, hereinafter the proxies 122-1, . . . , 122-N are referred to collectively as proxies 122)). A node agent 120 is in communication with the master node 102 and receives details for the configuration of the pods 116 from the API server 106. The node agent 120 uses the received details to ensure that the constructed containers 118 are operating as intended. In addition, the node agent 120 may also receive information about specific services from the storage 110 to obtain information related to services and to create details related to newly created services.

Each of the proxies 122 function as a network proxy, or hub through which requests are transferred, and as a load balancer for a service on a single worker node 104 which acts as a reverse proxy and distributes network or operation traffic across a number of servers. The load balancer is used to increase capacity (concurrent users) and reliability of operations and perform network routing for transmission control protocol (TCP) and user data protocol (UDP) packets. The proxies 122 are responsible for routing traffic to the appropriate container 118 in order to enable access to services based on an IP address and numbering of an incoming request for creating an operation.

In this way, the resources of the worker nodes 104 may be combined together and identified so that when an operation or program is to be created or deployed onto the cluster 100, the program or services for creating and running the service are located throughout the individual worker nodes 104. If any of the nodes 104 are added or removed, the cluster 100 is able to create or deploy the programs or services by combining resources from different nodes 104 or using a combination of different services within the nodes 104.

In order to deploy containerized operations in a containerized management system, such as a Kubernetes system, for example, a deployment configuration for providing instructions on how to create and update services for creating a desired operation can be input to the master node 102 via a command line interface 108, such as a kubectl command line interface for example. Once the instructions on how to create and update services for creating a desired operation have been received by the master node 102, the API server 106 of the master node 102 schedules the operation onto individual worker nodes 104 within the cluster 100 to create the operation using a combination of multiple different services within multiple different containers 118 of multiple different pods 116 of the cluster 100. In this way, the operation is created using a combination of services located in multiple containers 118 located within one or more pods 116 within one or more worker nodes 104.

Once the operation has been created and scheduled, the master node 102 continuously monitors the pods 116. If the master node 102 determines that a service used for the operation located within one of the containers 118 of the pods 116 goes down or is deleted, the master node 102 replaces the deleted or nonoperating pod associated with the operation using a different combination of the currently available services within the containers 118 of the pods 116 of the cluster 100. In this way, the API server 106 monitors the functionality of the pods 116, and when the pods 116 no longer functions as intended, recreates the pod 116.

Figure 2:
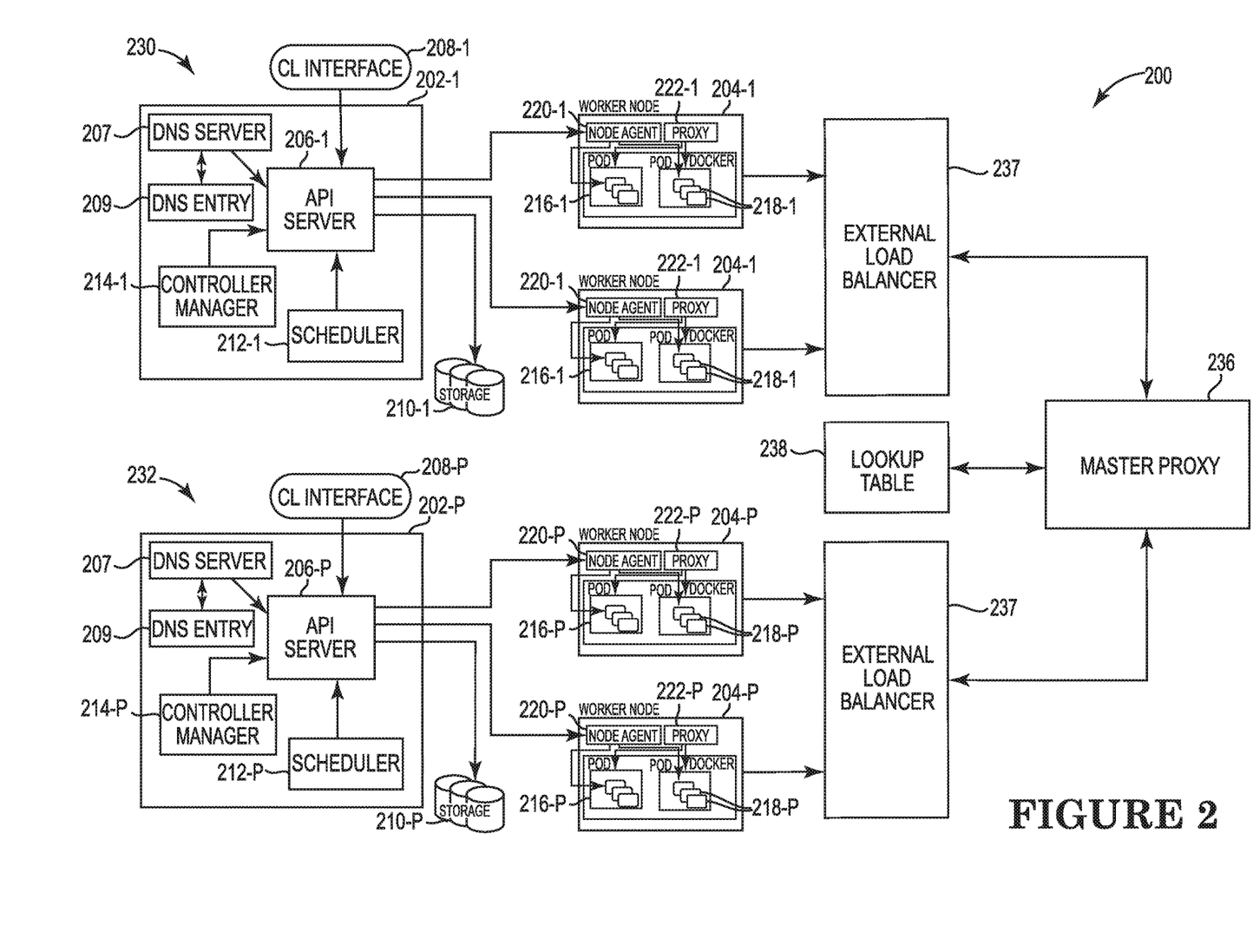
FIG. 2 is a schematic diagram of a container management system consistent with the present disclosure.

FIG. 2 is a schematic diagram of a container management system 200 consistent with the present disclosure. As illustrated in FIG. 2, the container management system 200 according to the present disclosure can include a first cluster 230 and a second cluster 232 located remotely from the first cluster 230. For example, the first cluster 230 may be located in one geographic area or country and the second cluster 232 may be remotely located in another different geographic area or country. Similar to the example cluster 100 described above, each of the clusters 230 and 232 include a master node 202 and multiple worker nodes 204.

Each of the master nodes 202-1, . . . , 202-P (hereinafter referred to collectively as master nodes 202) includes a corresponding API server 206-1, . . . , 206-P (hereinafter referred to collectively as API servers 206) that provides both the internal and external interface to Kubernetes via the master node 202. The API servers 206 receives REST commands from a corresponding command line interface 208-1, . . . , 208-P (hereinafter referred to collectively as command line interfaces 208), such as a kubectl command line interface for example, and the results of the REST commands are processed by the API servers 206 and are stored in a corresponding storage component 210-1, . . . , 210-P (hereinafter referred to collectively as storage components 210) included in the master nodes 202, such as an etcd storage component for example. The master nodes 202 also include a corresponding scheduler 212-1, . . . , 212-P and a controller manager 214. The scheduler 212 is included in the master nodes 202 to deploy constructed pods and services onto the worker nodes 204. The scheduler 212 includes information regarding available resources on members of the clusters 202, as well as resources utilized to for the services to run. As a result, the schedulers 212 make decisions on where to deploy a specific service within the worker nodes 204. The controller managers 214 uses the API servers 206 to watch the shared state of the corresponding clusters 102 and makes corrective changes to the current state of the clusters 202 to change the current state to another desired state. For example, the controller manager 214 may be a replication controller, which takes care of the number of pods in the system. The replication factor is constructed by the user, and the controller mangers 214 are then responsible for recreating a failed pod or removing an extra-scheduled pod within the corresponding worker nodes 204.

A multiple number of pods 216 are co-located in each of the worker nodes 204, and one or more containers 218 reside within each of the pods 216. The containers 218 are co-located on the host machine for each of the clusters 230 and 232 and can share resources. The pods 216 add a higher level of abstraction by grouping containerized components that shared resources, such as storage, Linux namespaces, cgroups, IP addresses, and so forth. Each of the pods 216 is assigned a unique IP address within the clusters 203 and 232, which allows operations to use ports without the risk of conflict. Each of the pods 216 can define a volume, such as a local disk directory or a network disk, and expose the volume to the containers 218 within the pods 216. The pods 216 may be managed manually through the API server 206, or the management of the pods 216 may be delegated to the controller 114. The containers 218 hold the running operation along with the libraries and components necessary to run the desired software necessary for running an operation. These components include files, environment variables, dependencies and libraries. The host operating system constrains access of the containers 218 to physical resource, such as CPU, storage and memory, so that a single container 218 cannot take up all of a host's physical resources.

The pods 216 for each of the clusters 230 and 232 included in a single worker node 204 are created, destroyed and re-created on demand, based on the state of the server and the service itself, and therefore are not intended to continue to exist for a long period of time. Because of the typically short lifespan of the pods 116, the IP address that they are served on may change, making the communication of the associated microservices difficult.

Each of the worker nodes 204 include a node agent 220, such as a kubelet for example, and a proxy 222, such as a kube-proxy for example. The node agents 220 within each of the clusters 230 and 232 are in communication with the master nodes 202 of the respective clusters 230 and 232 and receive the details for the configuration of the pods 216 from the corresponding API servers 206. The node agents 220 use the received details to ensure that the containers 218 are operating as intended. In addition, the node agents 220 may also receive information about specific services from the corresponding storage component 210 to obtain information related to services within the associated cluster 230 and 232 and to create details related to newly created services.

The proxies 222 function in each cluster 230 and 232 as a network proxy, or hub through which requests are transferred, and a load balancer for a service on one of the workers nodes 204 which acts as a reverse proxy and distributes network or operation traffic across a number of servers. The load balancer is used to increase capacity (concurrent users) and reliability of operations and performs network routing for transmission control protocol (TCP) and user data protocol (UDP) packets. The proxies 222 are responsible for routing traffic to the appropriate containers 218 within a given cluster 230 and 232 based on an IP address and numbering of an incoming request for creating an operation.

In some instances, the master node 202 of the cluster 230, for example, may receive a deployment configuration for creating a desired operation via a command line interface 208, such as a kubectl command line interface for example, for which is it necessary to utilize a service within a container 218 that is available within a remote cluster, such as cluster 232. In order for cluster 230 to communicate with a service within another separately located cluster, such as cluster 232, a public IP needs to be assigned to the desired service in order for the first cluster 230 to receive the service from the second cluster 232. The assigned IP is then visible to the internet causing security concerns if the user associated with the first cluster 230 or the second cluster 232 desires that the service not be made publicly available. Therefore, the container management system 200 according to the present disclosure includes an http(s) master proxy 236 accessible to each of the multiple clusters 230 and 232. A load balancer 237 associated with each of the multiple clusters 230 and 232 is positioned between the clusters 230 and 232 and the master proxy 236. The load balancer 237 operates to distribute the incoming cluster requests for services from the clusters 230 and 232 to the master proxy 236, along with the returning responses to the requests for services from the master proxy 236 to the cluster initiating the requests.

When a service for a desired operation being run inside one of the clusters 230 and 232, say cluster 230 for example, wants to communicate with a service that is located within a second remotely located cluster, say cluster 232, cluster 230 sends a request to connect to the service to the master proxy 236. The request includes the cluster name for the remote cluster 232, and therefore the master proxy 236 is then able to identify the remote cluster 232 from the request using a lookup table 238. The master proxy 236 removes the cluster name from the URL of the request, resolves a DNS name using a kube-dns 207 for example, which schedules the DNS pod and services on the cluster, and configures the kubelets to instruct individual containers to use the DNS service's IP to resolve DNS names 209. The request is then communicated to the remote cluster 232 via a local proxy of the cluster 232. The local proxy of the cluster 232 then queries the kube-dns to obtain a corresponding IP address of the service. The master proxy 236 receives a response from the remote cluster 232, adjusts the response from the remote cluster 232 and communicates the service back to the cluster 230 that initiated the request, as described below in detail. The load balancer 237 operates to distribute the incoming cluster requests for services from the clusters 230 and 232 to the master proxy 236, along with the returning responses to the requests for services from the master proxy 236 to the cluster initiating the requests.

Figure 3:
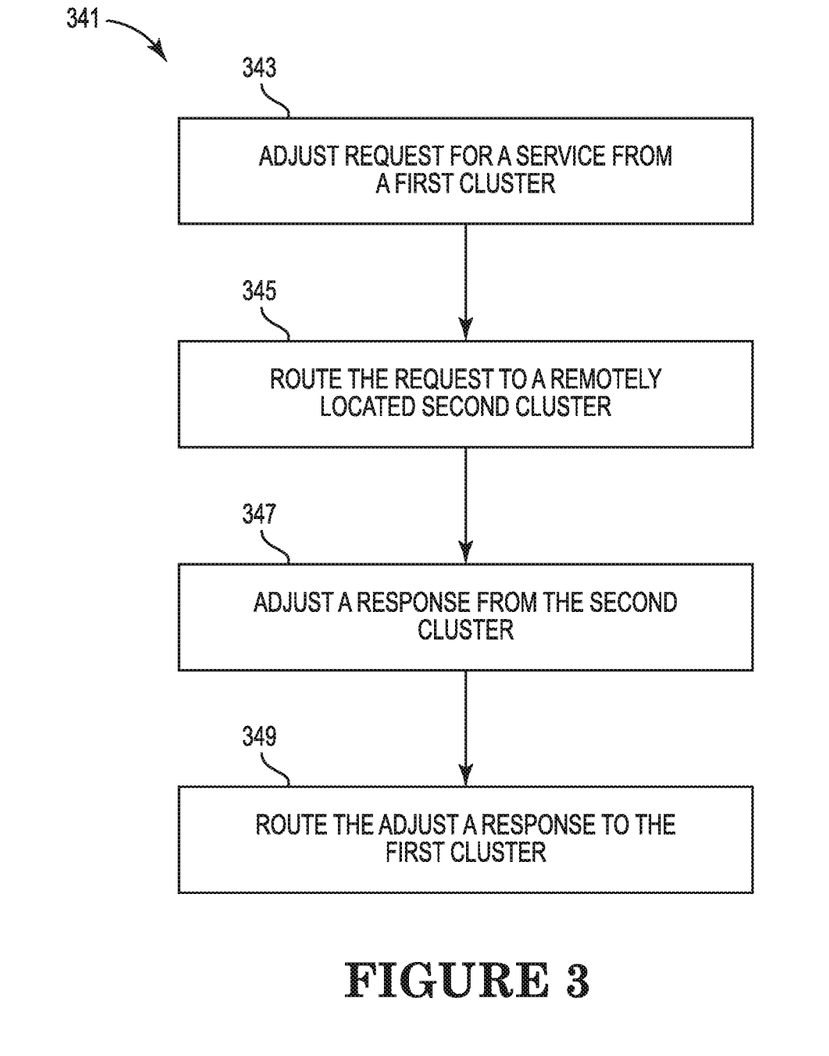
FIG. 3 is a flowchart of a method of generating a request for accessing a remote service in a container management system according to an example consistent with the present disclosure.

FIG. 3 is a flowchart of a method 341 of generating a request for accessing a remote service in a container management system according to an example consistent with the present disclosure. In some examples, the method 341 can include, at 343, adjusting a request from a first cluster requesting the use of a service from a second cluster that is located remotely from the first cluster. At 345, the adjusted request can be routed to the remotely located second cluster. At 347 a response from the remote second cluster can be adjusted based on the adjusted request from the first cluster, and at 349 the adjusted response from the second cluster can be routed to the first cluster so that the first cluster can generate the desired cluster service within the first cluster based on the first service and the second service.

In this way, when a given cluster transmits a request to access a second service within a remote cluster, the cluster generates a domain name service (DNS) request for accessing the second service and transmits the request to the master proxy 236. The request can include a first portion identifying the second service and a second portion identifying the remote cluster. For example, the DNS request may be generated as "service2.cluster2", where the first portion of the DNS request, "service2", is the name identifying the remote service and the second portion of the DNS request, "cluster2", is the name identifying the remote cluster. Upon receipt of the request, the master proxy 236 adjusts the request by removing the second portion of the DNS, namely "cluster2" and determines the IP address for the remote cluster based on the second portion, i.e., "cluster2", from the lookup table 238. The master proxy 236 routes the transmission of the adjusted request, i.e., "service2" to the local proxy operating on the remote cluster using the determined IP address. In this way, the cluster generating the request is in communication with the service of the remote cluster, thereby enabling the cluster to generate the desired cluster service using the second service of the remote cluster, as described below in detail.

Figure 4:
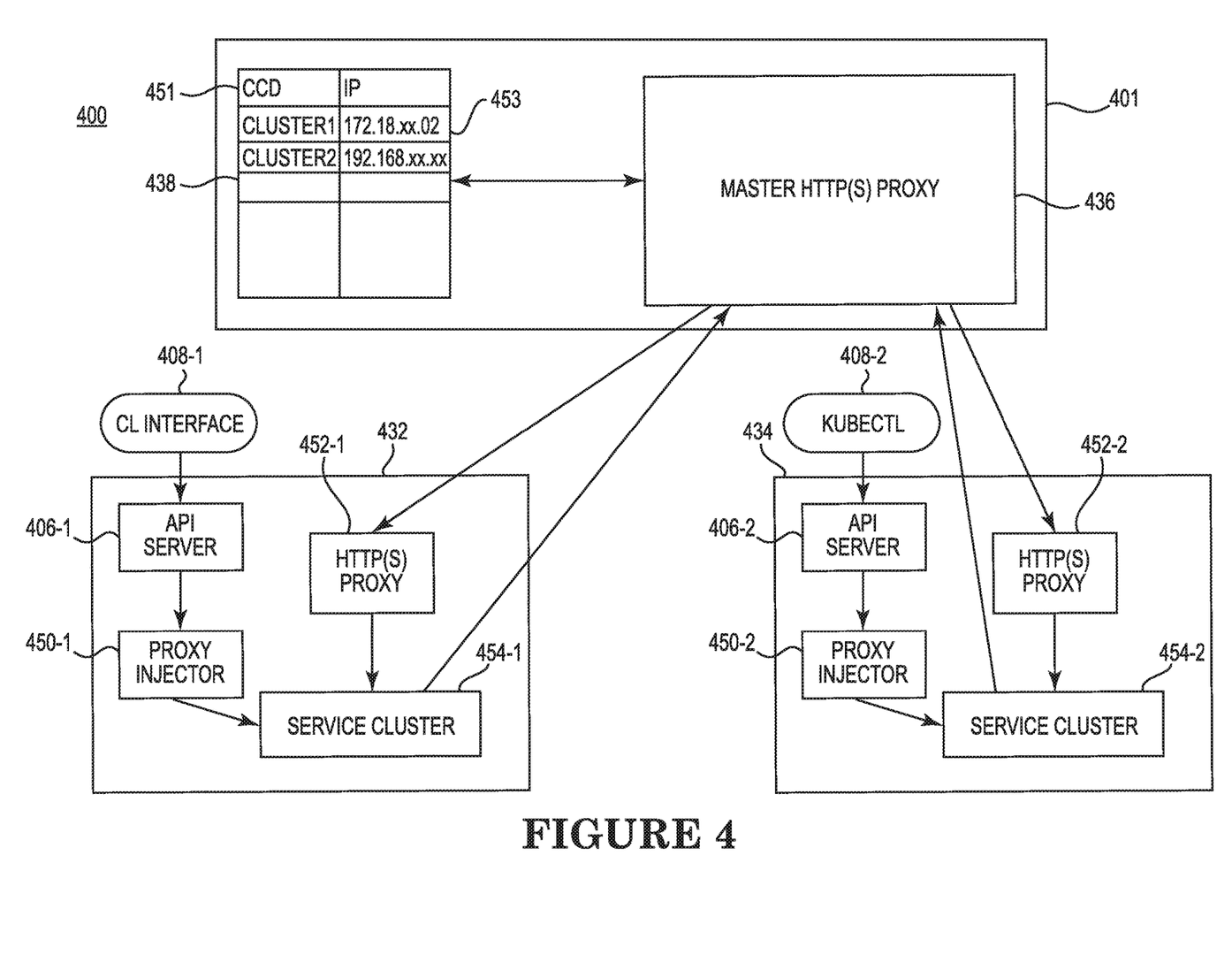
FIG. 4 is schematic diagram illustrating a container management system 400 according to an example consistent with the present disclosure.

FIG. 4 is schematic diagram illustrating a container management system 400 according to an example consistent with the present disclosure. As illustrated in FIG. 4, the container management system 400 includes a proxy configuration system 401 and multiple cluster 432 and 434, with cluster 434 being located remotely from cluster 432. The proxy configuration system 401 includes a master proxy 436 and a lookup table 438. The lookup table 438 can include a list of cross cluster IDs (CCD) 451 for each of the clusters within the container management system 400 along with an IP address 453 associated with each CCD 451. Each of the clusters 432 and 434 of the container management system 400 is in communication with the master proxy 436, and the master proxy 436 can access the lookup table 438 to identify the cluster 432 and 434 during receipt of a request for accessing a remote service, as described below in detail in reference to FIGS. 4-6.

Each of the cluster 432 and 434 include a respective API server 406-1, 406-2 (hereinafter referred to collectively as API server 406), controller manager, and scheduler (not shown in FIG. 4). In addition, each of the clusters 432 and 434 include a respective proxy injector 450-1, 450-2 (hereinafter referred to collectively as proxy injector 450) for injecting deployments of operations, along with a respective local HTTP(s) proxy 452-1, 452-2 (hereinafter referred to collectively as local proxies 452) to receive communications from the master proxy 436 and multiple respective service clusters 454-1, 454-2 (hereinafter referred to collectively as service cluster 454) for creating the operation. While one service cluster 454 is shown within the clusters 432 and 434 in FIG. 4 for brevity sake, it is understood that each cluster 432 and 434 may include any number of service clusters 454. The further details of the container management system 400, along with the message flow for deploying an operation and for generation of a request for accessing a remote service within the container management system 400 are further described below in reference to FIGS. 4-6.

Figure 5:
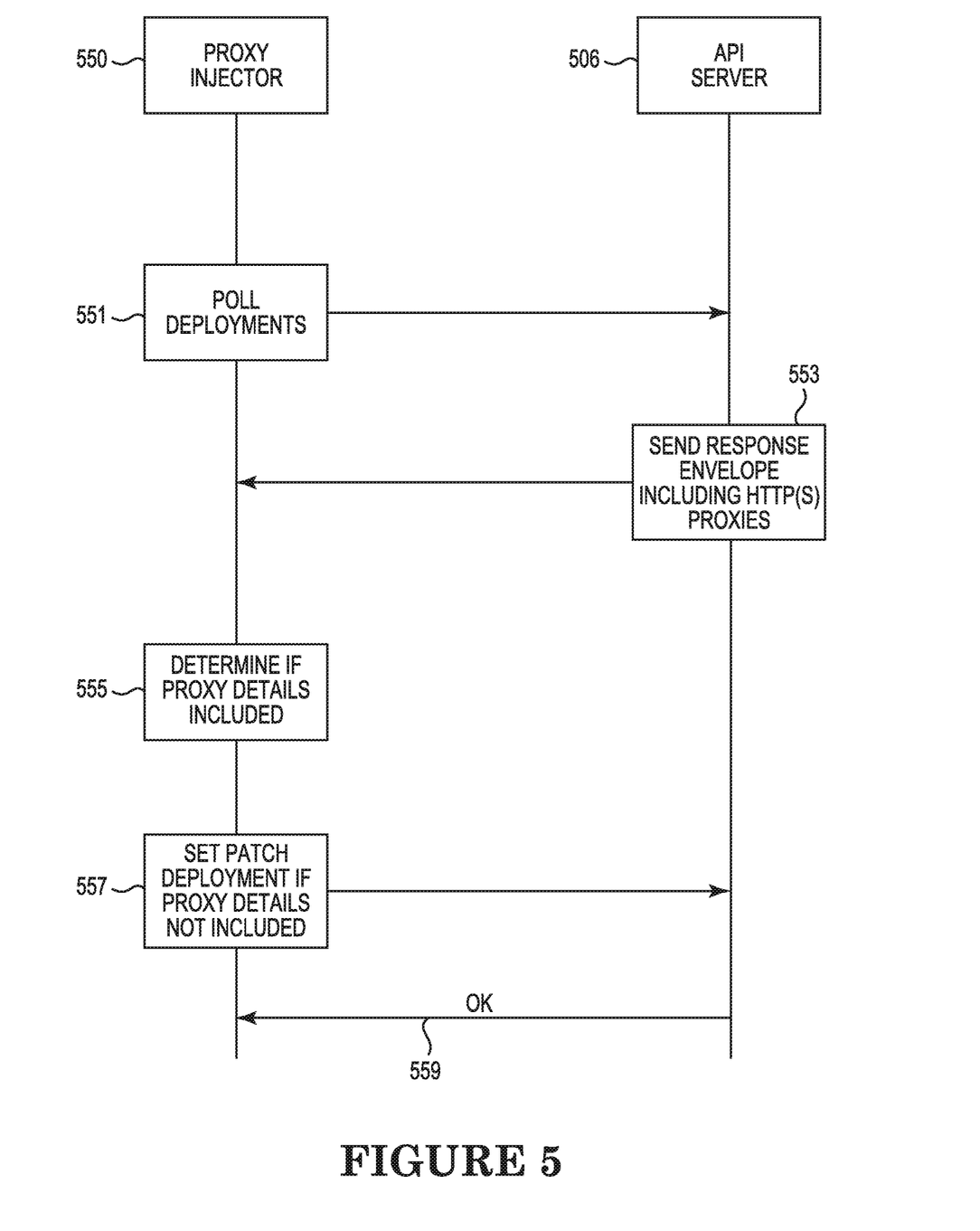
FIG. 5 illustrates an example of a message flow for deploying an operation in a container management system according to an example consistent with the present disclosure.

FIG. 5 illustrates an example of a message flow for deploying an operation in a container management system according to an example consistent with the present disclosure. As illustrated in FIGS. 4 and 5, the proxy injector 550 can continuously poll the API server 506 of the respective clusters 432 and 434 in order to get deployments 551 from API server 506 for operation requests received by the API server 506 via a respective command line interface 408-1, 408-2 (hereinafter referred to collectively as command line interface 408), such as a kubectl command line interface for example. The API server 506 sends a response envelope 553 including available master proxy details, such as the HTTP_PROXY, HTTPS_PROXY, http_proxy and https_proxy, to the proxy injector 450. and the proxy injector 450 determines whether the received envelope for the deployment includes the necessary master proxy details 555. If the necessary master proxy details are not set for a deployment, the proxy injector 450 sets the master proxy IP using the master proxy details and initiates a PATCH deployment call to the API server 506 to add the variables to the deployment 557. The API server 506 receives the patch deployment from the proxy injector 550, sends an indication that the PATCH deployment call was received 559 and initiates the patch deployment, including the IP address for the deployment. In this way the proxy injector 550 insures that each service within the service clusters 454 includes a corresponding master IP address.

Returning to FIG. 4, in addition to having an associated IP address, each of the services within the service clusters 454 is also assigned a domain name service (DNS) name. The DNS name includes a portion identifying the name of the service. Each of the services within the service clusters 454 is also assigned a cross cluster ID (CCD) to identify the cluster 402 and 404 within which the service cluster 454 resides. For example, a service within service cluster 454 of cluster 432 may be assigned an IP address 172.18.xx.03, where the "xx" indicates a path supported and may be anything from 0 to 255 to form a valid IP address, a DNS name http://service1 and a CCD http://service1.cluster1, while a service within service cluster 454 of cluster 434 may be assigned an IP address 192.168.xx.03, where the "xx" indicates a path supported by the service, a DNS name http://service2 and a CCD http://service2.cluster2.

Figure 6:
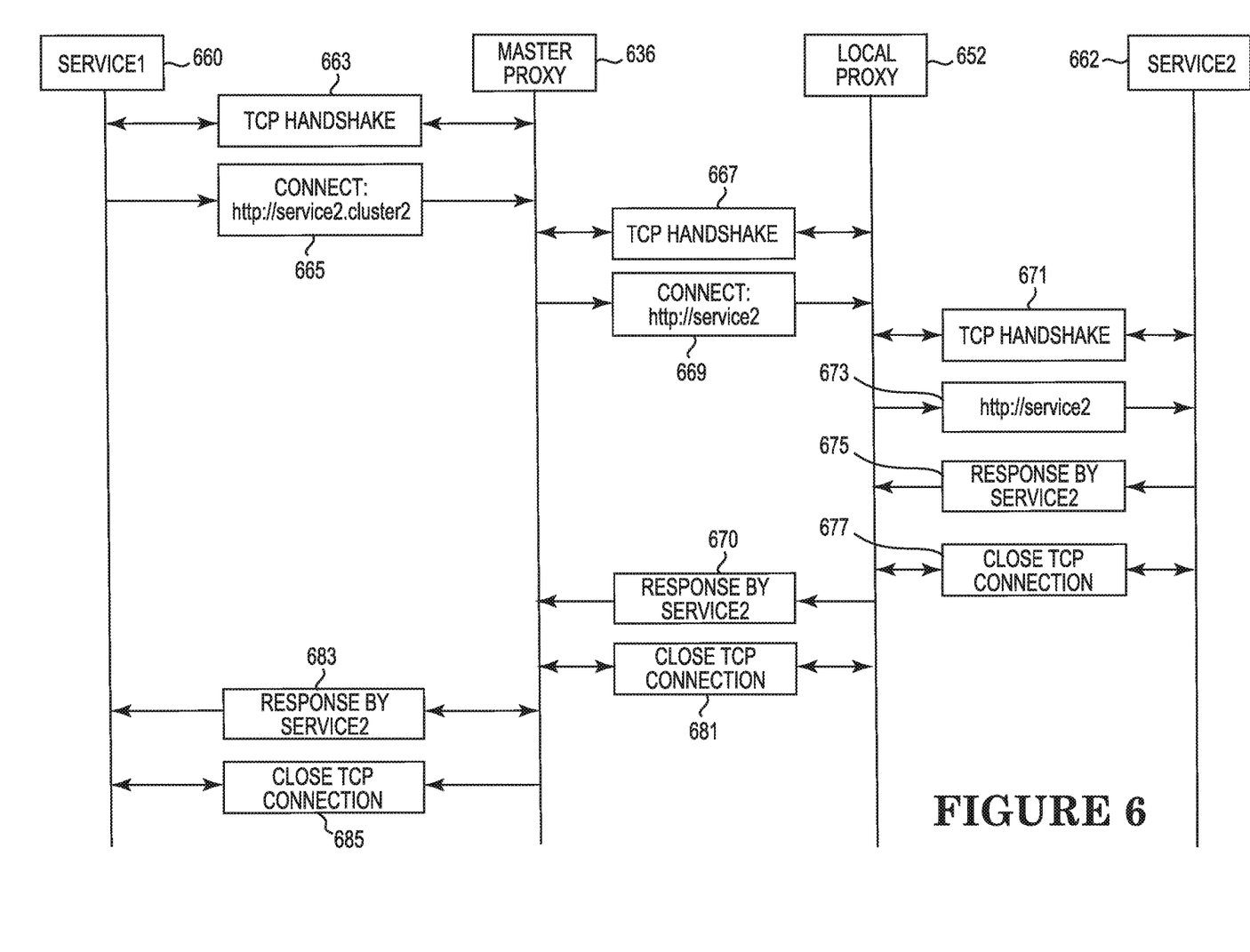
FIG. 6 illustrates an example of a message flow for requesting a service from a remote cluster in a container management system according to an example consistent with the present disclosure.

FIG. 6 illustrates an example of a message flow for requesting a service from a remote cluster in a container management system according to an example consistent with the present disclosure. As illustrated in FIGS. 4 and 6, in an example where it is necessary for service1 660 of the service cluster 454 of cluster 432 to utilize service2 662 of the service cluster 454 of the remote cluster 404, a request is sent from service1 of cluster 402 to the master proxy 436 to connect to service2 of cluster 432 by first generating a transmission control protocol (TCP) handshake 663 between the service 660 and the master proxy 634 to establish communication between the service 660 and the master proxy 634. Once the handshake 663 and the connection is established, the request to connect is sent to the master proxy 634 by the service 660 using the DNS name "http://service2.cluster2" 665. The master proxy 634 receives the request and generates a TCP handshake 667 with the local proxy 652 of the remote cluster 432 to establish a connection between the master proxy 636 and the local proxy 652 of the remote cluster 434. Once the TCP handshake 667 is completed and the connection is established, the master proxy 636 identifies the remote cluster 434 using the lookup table 438. For example, the master proxy 636 searches for the CCD 451 for "cluster2" in the lookup table 438 and determines the associated IP address 453 for the local proxy operating on cluster2, namely "192.168.xx.xx" in the example lookup table 438 of FIG. 4. The master proxy 636 adjusts the DNS name by removing the portion identifying the remote cluster 432 resulting in the DNS name "http://service2" being utilized in the request to connect that is sent 669 from the master proxy 634 to the local proxy 652 of the remote cluster 432 using the IP address 453. "192.168.xx.xx".

Upon receiving the request to connect 669, the local proxy 652 generates a TCP handshake 671 with the service2 of the remote cluster 432 to establish a connection between the local proxy 652 of the remote cluster 434 and the service2 of the remote cluster 434. Once the TCP handshake 671 is completed and the connection is established, the local proxy 652 of the remote cluster 434 identifies the IP address associated with service2 662 and transmits the request 673 to service2 662 using the identified IP address. Service2 662 receives the request and transmits a corresponding response 675 to the local proxy 652. Upon completion of the transmission of the response 675 from the service2 662 to the local proxy 652, the TCP connection 671 established between the local proxy 652 and the service2 662 is closed 677.

The local proxy 652 receives the response 675 from the service2 662 and transmits a response 670 to the master proxy 634. Upon completion of the transmission of the response 670 from the local proxy 652 to the master proxy 634, the TCP connection 667 established between the local proxy 652 and the master proxy 636 is closed 681. The master proxy 636 receives the response 670 from the service2 662 and transmits the response 683 to the service1 660 in the cluster 430 that initiated the connection request 665. In this way, the master proxy 634 generates a communication link between the service1 660 within the first cluster 432 and the service2 662 within the second cluster 434. The first cluster 430 is then able to generate a cluster operation based on the first service 660 and the second service2 662 received from the remote second remote cluster 432.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A method of requesting access to a remote service in a container management system, comprising:
    receiving, by a master proxy of the container management system positioned between a first cluster of the container management system and a second cluster of the container management system, a request from the first cluster for a service running on the second cluster, wherein the first cluster and the second cluster are located remotely from each other;
    facilitating, by the master proxy, communication between the first cluster and the second service without publicly exposing an Internet Protocol (IP) address associated with the second service by:
        adjusting the request;
        routing a transmission of the adjusted request to the second cluster;
        adjusting a response to the adjusted request from the second cluster; and
        routing transmission of the adjusted response from the second cluster to the first cluster; and
    generating a cluster service within the first cluster based on the first service and the second service.

2. The method of claim 1, wherein the request from the first cluster comprises a domain name service (DNS) name comprising a first portion identifying the second service and a second portion identifying the second cluster and further comprising removing the second portion of the DNS name to adjust the request.

3. The method of claim 2, further comprising:
    determining the IP address associated with the second service based on the second portion; and
    routing the transmission of the adjusted request based on the determined IP address.

4. The method of claim 1, further comprising injecting master proxy details for the first service, the master proxy details comprising an IP address, a domain name service, and a cross cluster identification.

5. The method of claim 1, further comprising receiving the adjusted request at a local proxy within the second cluster.

6. The method of claim 5, further comprising:
    transmitting a response to the adjusted request from the second service to the local proxy; and
    transmitting the response from the local proxy to the first service.

7. The method of claim 1, wherein the first cluster and the second cluster comprise kubernetes clusters.

8. A container management system, comprising:
    a first cluster comprising a first host machine, having a first processing unit and a first memory, running a first plurality of containers, wherein the first plurality of containers provide a first service for generating a first operation;
    a second cluster comprising a second host machine, having a second processing unit and a second memory, running a second plurality of containers, wherein the second plurality of containers provide a second service for generating a second operation, wherein the second cluster is located remotely from the first cluster; and
    a master proxy to facilitate communication between the first cluster and the second service without publicly exposing an Internet Protocol (IP) address of the second service by adjusting a request from the first cluster to access the second service, routing a transmission of the adjusted request to the second cluster, and adjusting a response to the adjusted request from the second cluster to the first cluster, wherein the first cluster generates a cluster operation based on the first service and the second service.

9. The system of claim 8, wherein the master proxy generates a communication link between the first service and the remote second service.

10. The system of claim 8, wherein the request from the first cluster comprises a domain name service (DNS) name comprising a first portion identifying the second service and a second portion identifying the second cluster, and wherein the master proxy removes the second portion of the DNS name to adjust the request.

11. The system of claim 10, further comprising a lookup table, the lookup table comprising a cross cluster identifier and an IP address associated with the second cluster, wherein the master proxy determines the IP address of the second cluster based on the second portion and routes the transmission of the adjusted request based on the determined IP address.

12. The system of claim of claim 8, further comprising a proxy injector to inject master proxy details for the first service, the proxy details comprising an IP address, a domain name service, and a cross cluster identification.

13. The system of claim 8, further comprising a local proxy positioned within the second cluster, wherein the local proxy receives the adjusted request from the master proxy and transmits the adjusted request to the second service.

14. The system of claim 13, wherein the second service transmits the response to the adjusted request to the local proxy and the local proxy transmits the response to the master proxy.

15. The system of claim 8, wherein the first cluster and the second cluster comprise kubernetes clusters.

16. A non-transitory machine readable medium storing instructions, which when executed by a processing resource of a master proxy of a container management system positioned between a first cluster of the container management system and a second cluster of the container management system cause the processing resource to perform a method comprising:

receiving a request from the first cluster for a service running on the second cluster, wherein the first cluster and the second cluster are located remotely from each other;

facilitating communication between the first cluster and the second service without publicly exposing an Internet Protocol (IP) address associated with the second service by:

adjusting the request;

routing a transmission of the adjusted request to the second cluster;

adjusting a response to the adjusted request from the second cluster; and         routing transmission of the adjusted response from the second cluster to the first cluster; and     generating a cluster service within the first cluster based on the first service and the second service.

17. The non-transitory machine readable medium of claim 16, wherein the request from the first cluster comprises a domain name service (DNS) name comprising a first portion identifying the second service and a second portion identifying the second cluster and further comprising removing the second portion of the DNS name to adjust the request.

18. The non-transitory machine readable medium of claim 17, further comprising:

determining the IP address associated with the second service based on the second portion; and     routing the transmission of the adjusted request based on the determined IP address.

19. The non-transitory machine readable medium of claim 16, wherein the method further comprises injecting master proxy details for the first service, the master proxy details comprising an IP address, a domain name service, and a cross cluster identification.

20. The non-transitory machine readable medium of claim 16, wherein the first cluster and the second cluster comprise kubernetes clusters.

\* \* \* \* \*